(12) United States Patent
King et al.

(10) Patent No.: US 7,031,964 B1
(45) Date of Patent: Apr. 18, 2006

(54) PROVIDING A DIRECTORY OF FREQUENTLY USED HYPERLINKS ON A REMOTE SERVER

(75) Inventors: Peter F. King, Half Moon Bay, CA (US); Bruce V. Schwartz, San Mateo, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/533,556

(22) Filed: Feb. 24, 1999

Related U.S. Application Data

(63) Continuation of application No. 08/996,379, filed on Dec. 22, 1997, now Pat. No. 5,895,471.

(60) Provisional application No. 60/052,394, filed on Jul. 11, 1997.

(51) Int. Cl.
    G06F 7/00      (2006.01)
    G06F 17/00     (2006.01)
    G06F 17/30     (2006.01)

(52) U.S. Cl. ........................... 707/10; 707/3; 707/104.1
(58) Field of Classification Search .................. 707/10, 707/104.1, 9, 3, 6, 203; 709/229, 219, 236, 709/200, 206, 245, 3, 9; 340/7.2
See application file for complete search history.

(56) References Cited

U.S. PATENT DOCUMENTS

| 5,321,840 | A | 6/1994 | Ahlin et al. |
| 5,434,918 | A | 7/1995 | Kung et al. |
| 5,673,322 | A | 9/1997 | Pepe et al. |
| 5,689,642 | A | 11/1997 | Harkins et al. |
| 5,689,825 | A | 11/1997 | Averbuch et al. |
| 5,703,942 | A | 12/1997 | Pinard et al. |
| 5,708,780 | A | 1/1998 | Levergood et al. |

(Continued)

FOREIGN PATENT DOCUMENTS

EP    0890907 A1    1/1999

(Continued)

OTHER PUBLICATIONS

Bill N. Schilit, et al., "Context-Aware Computing Applications," Proceedings of the IEEE Workshop on Mobile Computing System and Applications, Dec. 8-9, 1994, (pp. 1-7).
M. Frans Kaashoek, et al., "Dynamic Documents: Extensibility and Adaptability in the WWW," Proceedings of the IEEE Workshop on Mobile Computing Systems and Applications, Dec. 1994, (pp. 1-10), http://141.142.3.70/SGD/IT94/Proceedings/DDay/pinckney/dd.htm.

(Continued)

*Primary Examiner*—Frantz Coby
*Assistant Examiner*—Merilyn Nguyen
(74) *Attorney, Agent, or Firm*—Blakely, Sokoloff, Taylor & Zafman LLP (57) ABSTRACT

Access to hypermedia servers connected to networks such as the Internet can be provided through mobile devices such as wireless telephones. Hypermedia links such as Uniform Resource Locators (URL) are used to identify and control access to resources on the network. These links are usually very long, are difficult to remember, and are difficult to enter into many mobile devices. These difficulties could be overcome by storing lists of frequently used links or "bookmarks" in the mobile device but limited memory in the device generally prevents this. This limitation is overcome by storing designated hypermedia links on a bookmark server. In one embodiment, the URL of the bookmark server is sent to the mobile device during initialization of the device. By allowing a user can to save, retrieve and maintain lists of frequently used links on the bookmark server, access to favorite resources on a network is greatly simplified.

31 Claims, 1 Drawing Sheet

U.S. PATENT DOCUMENTS

| | | | |
|---|---|---|---|
| 5,717,923 A | 2/1998 | Dedrick | |
| 5,721,827 A | 2/1998 | Logan et al. | |
| 5,727,159 A | 3/1998 | Kikinis | |
| 5,740,430 A | 4/1998 | Rosenberg et al. | |
| 5,742,905 A | 4/1998 | Pepe et al. | |
| 5,754,939 A | 5/1998 | Herz et al. | |
| 5,761,436 A | 6/1998 | Nielsen | 395/200.75 |
| 5,764,235 A | 6/1998 | Hunt et al. | |
| 5,764,916 A | 6/1998 | Busey et al. | 395/200.57 |
| 5,796,832 A | 8/1998 | Kawan | |
| 5,796,952 A | 8/1998 | Davis et al. | 364/DIG. 1 |
| 5,805,159 A | 9/1998 | Bertram et al. | |
| 5,805,803 A | 9/1998 | Birrell et al. | |
| 5,809,415 A * | 9/1998 | Rossmann | 455/422.1 |
| 5,812,769 A * | 9/1998 | Graber et al. | 709/228 |
| 5,813,007 A | 9/1998 | Nielsen | 707/10 |
| 5,815,665 A | 9/1998 | Teper et al. | |
| 5,819,039 A | 10/1998 | Morgaine | 395/200.47 |
| 5,822,539 A * | 10/1998 | van Hoff | 709/236 |
| 5,825,759 A | 10/1998 | Liu | |
| 5,828,833 A | 10/1998 | Belville et al. | |
| 5,838,682 A | 11/1998 | Dekelbaum et al. | |
| 5,844,972 A | 12/1998 | Jagadish et al. | |
| 5,848,161 A | 12/1998 | Luneau et al. | |
| 5,857,201 A | 1/1999 | Wright, Jr. et al. | |
| 5,862,325 A | 1/1999 | Reed et al. | |
| 5,862,339 A | 1/1999 | Bonnaure et al. | |
| 5,867,153 A | 2/1999 | Grandcolas et al. | |
| 5,867,661 A | 2/1999 | Bittinger et al. | |
| 5,884,312 A | 3/1999 | Dustan et al. | |
| 5,887,171 A | 3/1999 | Tada et al. | |
| 5,895,471 A | 4/1999 | King et al. | |
| 5,896,444 A | 4/1999 | Perlman et al. | |
| 5,897,638 A * | 4/1999 | Lasser et al. | 707/102 |
| 5,901,287 A | 5/1999 | Bull et al. | |
| 5,903,845 A | 5/1999 | Buhrmann et al. | |
| 5,905,251 A | 5/1999 | Knowles | |
| 5,907,547 A | 5/1999 | Foladare et al. | |
| 5,909,671 A | 6/1999 | Byford et al. | |
| 5,918,019 A | 6/1999 | Valencia | |
| 5,923,756 A | 7/1999 | Shambroom | |
| 5,926,624 A | 7/1999 | Katz et al. | |
| 5,926,636 A | 7/1999 | Lam et al. | |
| 5,930,472 A * | 7/1999 | Smith | 709/203 |
| 5,930,474 A | 7/1999 | Dunworth et al. | |
| 5,935,207 A * | 8/1999 | Logue et al. | 709/219 |
| 5,940,831 A * | 8/1999 | Takano | 707/10 |
| 5,961,590 A | 10/1999 | Mendez et al. | |
| 5,982,370 A | 11/1999 | Kamper | |
| 5,991,760 A * | 11/1999 | Gauvin et al. | 707/10 |
| 5,999,940 A | 12/1999 | Ranger | |
| 6,000,031 A | 12/1999 | Bingaman et al. | |
| 6,041,360 A * | 3/2000 | Himmel et al. | 709/245 |
| 6,065,120 A | 5/2000 | Laursen et al. | |
| 6,067,552 A | 5/2000 | Yu | |
| 6,067,570 A | 5/2000 | Kreynin et al. | |
| 6,072,521 A | 6/2000 | Harrison et al. | |
| 6,105,028 A * | 8/2000 | Sullivan et al. | 707/10 |
| 6,119,167 A * | 9/2000 | Boyle et al. | 709/234 |
| 6,173,285 B1 | 1/2001 | Nishita et al. | |
| 6,208,659 B1 | 3/2001 | Govindarajan et al. | |
| 6,208,839 B1 * | 3/2001 | Davani | 340/7.2 |
| 6,209,036 B1 * | 3/2001 | Aldred et al. | 709/229 |
| 6,243,739 B1 | 6/2001 | Schwartz et al. | |
| 6,332,024 B1 | 12/2001 | Inoue et al. | |
| 6,374,291 B1 | 4/2002 | Ishibashi et al. | |
| 6,393,462 B1 * | 5/2002 | Mullen-Schultz | 709/206 |
| 6,405,037 B1 | 6/2002 | Rossmann | |
| 6,463,304 B1 | 10/2002 | Smethers | |
| 6,473,609 B1 | 10/2002 | Schwartz et al. | |
| 6,480,853 B1 | 11/2002 | Jain | |

FOREIGN PATENT DOCUMENTS

| | | |
|---|---|---|
| EP | 0891062 A2 | 1/1999 |
| WO | WO 99/07108 A | 2/1999 |
| WO | WO 99/441146 A1 | 9/1999 |

OTHER PUBLICATIONS

M. Frans Kaashoek, et al., "Dynamic Documents: Mobile Wireless Access to the WWW," To appear in Proceedings of the IEEE Workshop on Mobile Computing Systems and Applications, Santa Cruz, CA, Dec. 1994, (pp. 1-6).

Joel F. Bartlett, "Experience with a Wireless World Wide Web Client," Mar. 1995, WRL Technical Note TN-46, Mar. 1995, (Title Page, Table of Contents, and pp. 1-7), Western Research Laboratory, 250 University Avenue, Palo Alto, CA 94301, USA.

Geoffrey M. Voelker, et al., "Mobisaic: An Information System for Mobile Wireless Computing Environment," Proceeings of the IEEE Workshop on Mobile Computing Systems and Applications, Dec. 1994, (pp. 1-6).

Mika Liljeberg, et al., "Optimizing World-Wide Web for Weakly Connected Mobile Workstations: An Indirect Approach," To Appear in Proceedings of SDNE '95 (Jun. 5-6 Whistler, Canada), (pp. 1-8).

Stefan Gessler, et al., "PDA's As Mobile WWW Browsers," Computer Networks and ISDN Systems, vol. 28, #1-2, 1995, (pp. 53-59), http://www.ncsa.uiuc.edu/SDG/IT94/Proceedings/DDay/gessler/www_pda.htm (pp. 1-9).

Bill N. Schilit, et al., "TeleWeb: Loosely Connected Access to the World Wide Web," Fifty International World Wide Web Conference May 6-10, 1996, Paris, France. (pp. 1-14), http://www5conf.inria.fr/fich_html/papers/P47/Overview.htm.

"HDML 2.0 Language Reference," Version 2.0 Revision D, Jul. 1997, (pp. 1-40) Unwired Planet, Inc., 390 Bridge Parkway, Redwood Shores, CA 94065, USA.

"HDTP Specification 1.1," Version 1.1—Draft, Jul. 15, 1997, (pp. 1-40) Unwired Planet, Inc., 390 Bridge Parkway, Redwood Shore, CA 94065, USA.

"Managing Your Bookmarks" http://omega.cc.umb.edu/hartford/facweb/engine3Bb.htm, Nov. 1996.

"Managing Your Bookmarks Effectively" http://www.eiu.edu/mediasev/netscape2/manage.htm#com, Nov. 1998.

"Radio Web: The RadioMail Wireless Web Delivery Services" http://www.radiomail.net/product/services/radioweb/htm, Jul. 1996.

"Windows 95/98 URL and Bookmark Managers" http://www.winfiles.com/apps/98/url.html, Nov. 1998.

"ASF-Url/Bookmark Mangers" http://host2.fptoday.com/mylvoice/asf-url_bookmark.html, Nov. 1998.

"Bookmark Magic: Internet bookmark utility" http://www.cyber-matrix.com/blankmag.htm, Jun. 1998.

Tauscher et al. "Revistation Patterns in World Wide We Navigation"CH197, pp. 99-106, Sep. 1997.

Barrett et al. "How to Personalize the Web" CH197, pp. 75-82, Sep. 1997.

Girisburg et al. "A Viewer for PostScript Documents" UIST 96, pp. 31-32, Jul. 1996.

Weiss et al. "HyPursuit: A Hierarchical Network Search Engine that Exploits Content-Link Hypertext Clustering" Hypertext, 96, pp. 180-193, May 1996.

Satoh et al. "A Collaborative Supporting Method between Document Processing and Hypertext Construction" IEEE Database, pp. 533-536; Jul. 1993.

Samad et al. "A Browser for Large Knowledge Bares Based on a Hybrid Distributed/Local Connectionist Architecture" IEEE Database, pp. 89-99, Jul. 1991.

* cited by examiner

PROVIDING A DIRECTORY OF FREQUENTLY USED HYPERLINKS ON A REMOTE SERVER

CROSS-REFERENCE TO A RELATED APPLICATION

The present application is a continuation of U.S. patent application Ser. No. 08/996,379 filed Dec. 22, 1997, now U.S. Pat. No. 5,895,471, entitled "Providing a Directory of Frequently Used Hyperlinks on a Remote Server", which claims the benefit of U.S. Provisional Patent application No. 60/052,394, filed on Jul. 11, 1997.

MICROFICHE APPENDIX

A listing of particular embodiments of computer programs incorporating features of the present invention is provided in a microfiche appendix to this disclosure and is incorporated herein by reference. This appendix consists of 17 microfiche having a total of 1641 frames.

AUTHORIZATION WITH RESPECT TO COPYRIGHTS

A portion of the disclosure of this patent document, including but not limited to the microfiche appendix, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to devices and methods for interacting with hypermedia servers connected to networks. More particularly, the present invention pertains to structures and methods of system interactions arranged such that practical access to hypermedia servers is available to a wider range of devices such as wireless telephones.

BACKGROUND ART

Although networks like the Internet have been in existence for years, they have not been a popular medium of information exchange until very recently. The recent explosive growth in usage of the Internet, for example, is due in large part to the development of devices and methods that simplify the actions a user must take to access multimedia information stored by network servers.

One significant development is the use of hyperlinks which allows disparate pieces of information to be organized in nonsequential ways and which allows a user to easily navigate among the linked information. By assigning a unique identifier to each distinct piece of multimedia information available throughout a network, information can be readily accessed without regard to where it is stored. Network clients and servers participating in such a "hypermedia" network are referred to herein as hypermedia clients and hypermedia servers, respectively.

The Hypertext Transfer Protocol (HTTP) is one example of a method that implements hyperlinks and is probably the most widely used method for accessing the Internet today. A unique identifier, known as a Uniform Resource Locator (URL), specifies the location of a resource that can be accessed from the network.

HTTP clients and HTTP servers typically communicate with one another using any one of a family of communication protocols known collectively as Transmission Control Protocol/Internet Protocol (TCP/IP). One commonly used member of the family, known as Transmission Control Protocol (TCP), provides for a very reliable delivery of an information stream. According to the TCP, a sender establishes a "connection" with a receiver, transmits an information stream in basic units known as packets, and retransmits any packets that are either lost or corrupted during transmission. One advantage of the TCP is that it guarantees the receiver will receive the bits and bytes in the information stream in the correct order. Unfortunately, the TCP requires considerable computing and network bandwidth resources. The establishment of a connection, for example, may require an exchange of more than ten packets between sender and receiver.

In addition to the resources required to implement the TCP, the HTTP itself also requires considerable resources to format, process and display information. This is not a significant disadvantage in many situations because personal computers and other workstations with sufficient computing power, memory and display capabilities are readily available to implement the HTTP client function.

There is, however, a growing interest to provide access to hypermedia servers connected to networks such as the Internet through mobile devices, particularly handheld devices like wireless telephones. These devices are characterized by severe limitations in processing power, memory space, display size, and buttons or keys by which a user can request, view and manipulate information obtained from a hypermedia server. Furthermore, the bandwidth of the communication channels connecting the mobile devices to the rest of the network is also severely limited.

A wireless telephone has only a small fraction of the resources provided by a typical desktop or portable computer. Typically, the processing power is less than one percent of the processing power in many computers, the memory space is generally much less than 150 kilobytes (kB), and the display is perhaps four lines high and twelve or twenty characters wide. Graphics capabilities are very limited or nonexistent. The communication path is often in the range of 400 to 19,200 bits per sec. and the cost using that communication path is measured in terms of United States dollars per 100 kB or more.

Attempts to implement HTTP client functions in portable devices have not been very successful. Attempts that have used mobile devices providing facilities which are comparable to conventional computers are unattractive because the cost of the device is very high. Other attempts using less expensive devices are also unattractive because the client functions are severely limited. In either case, the communication delays and costs in exchanging packets with the network just to establish a connection, for example, are intolerable. The delays are particularly annoying in situations where a user is notified that electronic mail or other information has been received in the user's "mail box" somewhere on the network and the user must wait during the roundtrip delay required to request and receive that mail from the mail box. The usability of the device is further impaired because there is insufficient memory space to store lists of frequently used hyperlinks. For HTTP clients, these hyperlink identifiers are URLs that are often difficult to remember and difficult to enter into the device due to limited data entry capabilities. Two popular software products used in conventional computers refer to these stored hyperlinks as "bookmarks" and "favorites."

DISCLOSURE OF INVENTION

It is an object of the present invention to provide structures and methods required by devices to interact with hypermedia servers connected to networks so that practical access to such servers is available to a wider range of devices such as wireless telephones.

According to the teachings of the present invention in one embodiment of a system that comprises a remote device coupled to a directory server, the remote device is remotely located with respect to the directory server, comprises first storage, a display and a button, and executes a first program that causes the remote device to receive a unit of information from a hypermedia network, the unit of information having an identifier, and to present on the display a representation of the unit of information, to receive an input signal in response to the button being activated and, in response, to send an add request to the directory server that conveys the identifier, and the directory server comprises second storage that stores a directory associated with the remote device and executes a second program that causes the directory server to receive the add request and, in response, to add an entry to the directory representing the identifier.

The various features of the present invention and its preferred embodiments may be better understood by referring to the following discussion and the accompanying drawing. The contents of the following discussion and the drawing are set forth as examples only and should not be understood to represent limitations upon the scope of the present invention.

MODES FOR CARRYING OUT THE INVENTION

Overview

Figure 1:
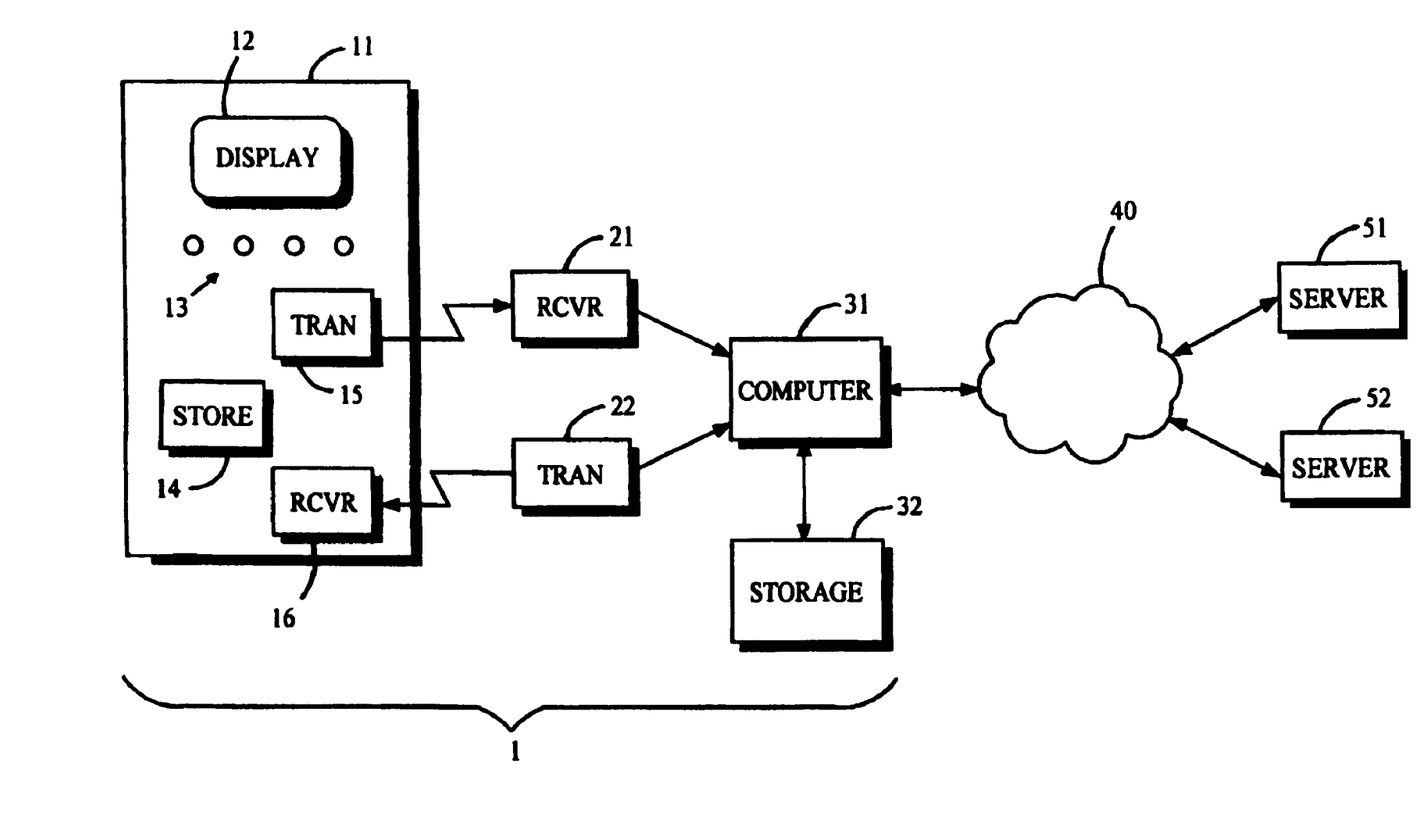
The FIGURE illustrates in schematic form the major components of a system in which a device such as a wireless telephone can access the resources provided by a hypermedia server connected to a network

The FIGURE illustrates a system in which various aspects of the present invention may be practiced. As will be explained below, some of the components illustrated in the FIGURE may be omitted in various embodiments. As shown, client 1 uses network 40 to access resources provided by server 51 and server 52. Although it is contemplated that server 51 and server 52 are hypermedia servers, perhaps operating in conformity with the Hypertext Transfer Protocol (HTTP), this is not necessary to practice the present invention.

Client 1 comprises computer 31 and device 11, which is remotely located with respect to computer 31. Remote device 11 and computer 31 perform functions that implement client 1. Remote device 11 provides a user interface through which information can be presented to a user and input can be received from a user. Computer 31 exchanges information with network 40 in a manner that is consistent with a conventional network client.

Computer 31 stores parameters and information in storage 32 that typically is a combination of random access memory (RAM), read-only memory (ROM) and long-term storage devices such as magnetic and optical disk drives. Computer 31 communicates with remote device 11 through receiver 21 and transmitter 22. Information that is sent by computer 31 through transmitter 22 is received by remote device 11 through receiver 16. Information that is sent by remote device 11 through transmitter 15 is received by computer 31 through receiver 21.

In the embodiment shown in the FIGURE, remote device 11 comprises display 12, one or more buttons 13, storage 14, transmitter 15 and receiver 16. For example, device 11 may be a wireless telephone such as a MobileAccess™ telephone by Mitsubishi Wireless Communications, Inc., or a Duette telephone by Samsung Electronics Corporation. In typical wireless telephones, the display 12 is a liquid crystal display (LCD) panel. Buttons 13 represent one or more data entry devices such as switches, keys or buttons. Storage 14 represents memory circuits or other devices that are capable of storing digital information. Preferably, at least part of storage 14 is persistent storage, meaning that information is retained when device 11 is turned off. In some embodiments, a portion of storage 14 is organized into a unified push/pull cache. It is also contemplated that a portion of storage 14 will store program instructions, either in persistent memory or in ROM, and that device 11 will comprise a microprocessor or other type of processing circuitry capable of executing the program instructions.

The nature of the communication paths shown between computer 31, server 51 server 52, receiver 21 and transmitter 22 are not critical to the practice of the present invention. Such paths may be implemented as switched and/or non-switched paths using private and/or public facilities. Similarly, the topology of network 40 is not critical and may be implemented in a variety of ways including hierarchical and peer-to-peer networks. Computer 31 and server 51, for example, may be locally located with respect to one another and may be implemented on the same hardware.

In concept, the nature of the communication paths between computer 31 and device 11 is also not critical to the practice of the present invention; however, in many applications device 11 is a wireless device that uses a communication technology such as electromagnetic transmission in the radio-frequency to infrared portions of the spectrum. In applications where device 11 is a wireless telephone, a cellular telephone for example, transmitter 15, receiver 16, receiver 21 and transmitter 22 represent communication facilities used for normal telephone calls.

Examples of devices and methods that may be used to practice various aspects of the present invention are discussed below. The following discussion describes variations of a preferred embodiment that implements client 1 according to the HTTP; however, it should be understood that the present invention is not so limited.

Remote Device

In applications where client 1 is implemented as a HTTP client, device 11 provides at least three basic functions. A navigation function allows a user to navigate or traverse HTTP Uniform Resource Locator (URL) hyperlinks. A communication function exchanges information with computer 31. An interface function provides a user interface through which information may be presented to the user and through which input may be received from the user.

Preferably, these functions are implemented by a software-controlled process using an event-driven architecture. Events may be initiated by a user through buttons 13, for example, or may be initiated by signals received through receiver 16. The navigation function operates in either of two states. In the "ready" state the device awaits user input specifying a hyperlink to traverse. In the "pending" state the communication function has submitted a request to computer 31 and the device is waiting for a reply from computer 31. In terms of the HTTP, the ready state waits for user input specifying the URL of a hypermedia entity to display or process and the pending state waits for computer 31 to provide a requested hypermedia entity.

In one embodiment, hypermedia information is exchanged with computer 31 according to the Handheld Device Transfer Protocol (HDTP). A specification for a version of this protocol, sometimes referred to as Secure UPLink Gateway Protocol (SUGP), is provided in an Annex. The HDTP resembles the HTTP but is optimized for use with remote devices like wireless telephones and preferably is conveyed using the User Datagram Protocol/IP (UDP/IP). The UDP/IP is generally regarded as being less reliable than UDP/EP, for example, because it does not guarantee that packets will be received, nor does it guarantee that packets will be received in the same order that they are sent. Datagram protocols like the UDP/IP are attractive in practicing the present invention, however, because it does not require a "connection" to be established between a sender and a receiver before information can be exchanged. This eliminates the need to exchange a large number of packets during session creation.

In a preferred embodiment, hypermedia information is organized according to a Handheld Device Markup Language (HDML) into cards and decks. Multiple decks and other types of message entities can be organized into information structures called digests. A specification for a version of HDML is provided in the Annex.

A "deck" is the smallest unit of HDML information that can be exchanged with computer 31. Each deck has a unique identifier or URL. A user may navigate from one deck to another by traversing hyperlinks that reference the desired deck. If remote device 11 has a cache for received decks, the device first consults the cache to determine if the requested deck is available. Remote device 11 may also be implemented to determine if a desired deck found in cache is also current, that is, not out of date. If so, that deck is accessed without requiring any communication with computer 31. If the requested deck is not in the cache or is out of date, however, a request for that deck is sent to computer 31. This is discussed in more detail below.

Because the display on remote device may be too small to show all the information in a deck at one time, each deck may be organized into one or more cards. A "card" is a unit of information that can be displayed and/or can define how a user may interact with the device.

There are several types of cards. A "display" card conveys information that is to be displayed. An "entry" card conveys a method that permits a user to enter information and typically also conveys information to display. A "choice" card presents alternatives for selection by a user. Entry and choice cards also convey methods to be performed by device 11 that carry out functions necessary to receive input or recognize the chosen alternative. Typically, entry and choice cards cause one or more state variables to be set according to the information that is entered or the alternative that is chosen. A display card can also set one or more variables. A special form of the display card does not cause any visible display but can be used to set one or more variables.

A "digest" is an optional information structure that may be used to facilitate the transmission and processing of multiple message entities including HDML decks. In particular, each message entity in a digest is processed in sequence according to entity type. In one embodiment, message entity types include HDML decks, images and alerts. One important use of the digest and the alert entity is discussed below.

The current state of the three basic functions, navigation, communication and interface, can be expressed in terms of the deck and card in that deck that is currently displayed and one or more variables needed to process the card. By saving this information in persistent storage, remote device 11 can restore the current state at a fixture time. A cache of decks, a navigation history of hyperlink traversals and a history of user activity can also be used to improve performance, provide additional functions to the user, and provide additional facilities for use by system developers.

Handheld devices like telephones have severely limited facilities for entering information. The input facilities of these devices are often limited to the familiar twelve keys of a pushbutton telephone. One common method for entering text is to assign letters to various numeric keys according to normal telephone conventions. For example, the letters ABC are assigned to the "2" key and the letters DEF are assigned to the "3" key. The letters Q and Z could be assigned to the "0" key, for example. According to this method, the letter A is entered by pressing the "2" key once and the letter B is entered by pressing the key twice. In preferred embodiments of remote device 11, a form of letter prediction is used to make text entry more efficient.

This prediction can be based on the statistics of letter combinations. For example, after entering the letters T and H, it is much more likely that a user will enter the letter E than the letters D or F. Accordingly, after entering T and H, in response to a user pressing the "3" key, remote device 11 will present the letter E first rather than the letter D. The prediction can be based on a table of probabilities for various three-letter combinations stored in storage 14.

Intermediate Computer

Computer 31, together with remote device 11, provides the functions of a conventional hypermedia client. In the embodiment discussed above, computer 31 receives information from remote device 11 according to the HDTP, translates the HDTP information into corresponding HTTP information as necessary, and sends the result to server 51. Similarly, computer 31 receives information from server 51 according to the HTTP, translates the HTTP information into corresponding HDTP information as necessary, and sends the result to remote device 11. Preferably, HDTP information exchanged with remote device 11 is compiled from a textual form into a binary form that reduces the bandwidth requirements of the communication channel and reduces the processing required by remote device 11 to parse and interpret the information. Alternatively or in addition, the information may be subjected to other types of data compression to reduce bandwidth requirements.

Basic Exchange of Messages

By using the UDP/IP, a session can be created more efficiently than is possible using the more common TCP/IP. The exchange of information needed to create a session is similar to the exchange carried out for other types of requests. An exchange can be initiated by remote device 1 sending a request to computer 31. Subsequently, computer 31 returns a reply to the request and remote device 11 acknowledges receipt of the reply. The reply may either be expected results of the request or it may be an indication of some error encountered while attempting to service the request. If remote device 11 does not receive a reply within some timeout interval, it will send the request to computer 31 again. Remote device 11 will send the request repeatedly until either it receives a reply message, or a standby or "HoldOn" message from computer 31. The length of the timeout interval can be user configurable or it can be established by information previously received from computer 31. Similarly, computer 31 will send the reply repeatedly until it receives the acknowledgement from remote device 11.

For example, remote device 11 may initiate the creation of a session by sending a session-creation request to computer 31. The request includes any necessary authentication information, one or more session parameters, and information describing the device and version of software in use. Computer 31 receives the request, validates the authentication information, checks that the user is entitled to initiate a session, assigns an identifier to the new session, builds a message containing the session identifier and any information that computer 31 wishes to pass to remote device 11, and sends the message to remote device 11. Preferably, this message also includes the URL of a "home page" associated with the device. Remote device 11 acknowledges receipt of the message and the session is established.

Get Request

As another example, when a user traverses a hyperlink, remote device 11 consults its cache, if any, and determines if the cache already has the requested hypermedia entity (HDTP deck). If it does and the deck in the cache is not out of date, remote device 11 can process the requested deck and no further action is required. If the requested deck is not available or is out of date, however, remote device 11 builds a message including a HDTP "Service Request" and the URL of the requested deck and sends the message to computer 31. According to the HDTP, the message also includes a header with information that is unique to the request. Remote device 11 then waits for a reply from computer 31. The reply may be the requested deck or it may be an indication that an error occurred while attempting to service the request.

Computer 31 receives the request, checks its validity and attempts to establish a connection with the appropriate network server, say server 51. If the connection fails, remote device 11 is notified. Otherwise, computer 31 builds a message that includes a HTTP "GET" method and the URL of the desired hypermedia entity. In one embodiment, the header of the message is constructed from "common" parameters that are common to all users, from "session" parameters that are unique to the session with remote device 11 and any "request" parameters that were passed in the header of the HDTP request. Preferably, any conflicts in the three sets of parameters are resolved in favor of request parameters first, session parameters second, and common parameters last. Alternatively, the HTTP header may be constructed from just common parameters, just session parameters, just request parameters, or any combination of these parameters.

After constructing the HTTP get request, computer 31 sends it through the established connection to server 51. Server 51 attempts to service the HTTP "GET" request and sends the result to computer 31 in a HTTP response. Computer 31 checks a result code contained in the header of the HTTP response. If the result code indicates an error occurred, computer 31 may take any of several possible actions explained below. If the result code indicates the request was serviced successfully, computer 31 builds an appropriate HDTP response containing the results of the get request and sends the HDTP response to remote device 11. Computer 31 may compress, encrypt or convert the result as desired. If server 51 does not respond with a complete result within a reasonable period of time, the connection is dropped and an error indication is returned to remote device 11.

Remote device 11 acknowledges receipt of the HDTP response and displays and/or processes message entities included in the response. If computer 31 does not receive an acknowledgement within a reasonable period of time, it sends the HDTP response again. Computer 31 may repeat the transmission one or more times until an acknowledgment is received. If an acknowledgement is not received after a desired number of attempts, computer 31 may discard the result and abandon the attempt to send it, save the result in storage 32 for a future attempt, or save a message for future transmission indicating the result was discarded.

Variations on the Get Request

Computer 31 may respond with error indications for a variety of circumstances. For example, computer 31 may notify remote device 11 that the requested URL is for a scheme or protocol that is not supported, or that the requested URL designates a network server that cannot be resolved using the Domain Name Service (DNS).

HTTP result codes are numerical codes of the form XXX. If the result code in a HTTP response is 301 or 302, a "redirection error," it indicates the requested resource has been moved. The new URL may be returned to remote device 11. Alternatively, computer 31 may respond to the redirection error by using the new URL to establish a connection with the new server, say server 52, construct a new HTTP get request and submit it to server 52. The response from server 52 and the new URL are returned to remote device 11.

If the result code in a HTTP response is 401, it indicates the user is not authorized access to a particular "realm." Computer 31 may check storage 32 to determine if there is a user name and password for the realm that generated the error. If an appropriate user name and password are available, computer 31 can resubmit the request with the authorizing information. If a user name and password are nor available, or if the resubmitted request results in a another unauthorized error, computer 31 may construct a HDTP deck with an entry card by which the user can enter the correct user name and password for the realm generating the error.

Generally, client errors (4xx), server errors (5xx) and other types of errors may be handled by computer 31 returning a deck with one or more display cards explaining the nature of the error and what course of action the user may consider taking.

Additional Functions and Features

Remote device 11 can use a post request to send data to a server. In one embodiment, remote device 11 builds a HDTP "Post" request including the URL of the intended network server and a block of data. Computer 31 constructs and sends a corresponding HTTP "POST" method in a manner similar to that described above for the get request.

Although many client functions do not need to be implemented to realize the benefits of the present invention, some client functions are important in many applications. These functions include creating and managing sessions with a hypermedia server, handling a variety of error conditions like those discussed above, authenticating a user to the server, establishing a private session and managing user certificates and encryption keys, managing a first level cache, handling redirection errors and validating hypermedia content.

The operational characteristics of client 1 are affected by parameters and other information stored in storage 32. Examples of operational characteristics include a list of authorized subscribers or users, resources that are available to each respective user, and timeout values for respective remote devices 11 and computer 31. In preferred embodiments, these parameters and information are maintained by a facility on computer 31 that operates as a network server, perhaps a HTTP server. In this manner, the operational characteristics of client 1 can be administered locally or remotely by an authorized network client.

The headers for each HTTP request can include a parameter that specifies what type of content for the response is acceptable. As mentioned above, in some embodiments this parameter can be obtained from common parameters, session parameters or request parameters. Computer 31 can check the content of any reply from a server and determine whether the content is acceptable to remote device 11. If the content is not acceptable, computer 31 may notify remote device 11 of the error. For example, content types such as applets, movies and certain types of images may not be acceptable. Alternatively, when possible, computer 31 may convert the content into a form that is acceptable. For example, computer 31 may be able to convert one type of image, say JPEG, into an acceptable form, say GIF.

Remote Device Initialization

An HDTP session can have a very long life, extending beyond the time remote device 11 is turned off. A session can also be interrupted by some other function remote device 11 is required to perform such as, for example, a wireless telephone initiating or receiving a voice telephone call. Remote device 11 can resume a suspended session with computer 31 by preserving session-related information in persistent storage. This information includes the session identifier and any information required to identify computer 31. In addition, if encryption has been in use for this session, the saved information can include encryption keys, flags indicating the type of encryption method, block-chaining values, or other information needed to resume encryption. Alternatively, encryption can be initiated anew as is done at time of session creation.

In an embodiment allowing resumption of a suspended session, remote device 11, when turned on, determines whether a session was suspended. If it was, remote device 11 sends a request to computer 31 using the session-related information stored in persistent storage. Computer 31 receives the request, validates the session and determines whether the session has expired. If the session is valid, computer 31 services the request. If the session is not valid, computer 31 returns an error indication to remote device 11 which can then initiate a request to create a new session.

At the time of session creation, remote device 11 establishes session parameters used to construct HDTP headers. These parameters can be set according to values provided by remote device 11 and/or computer 31. These parameters may include HTTP related values such as Accept, Accept-Charset and Accept-Language, and they may include values not related to the HTTP such as a timeout interval between sending retries, maximum packet length remote device 11 can accept and the encryption algorithm to use. Preferably, in subsequent exchanges between remote device 11 and computer 31 after these parameters are established, headers include only parameters that the receiving device does not already know.

Preferably, headers are formed in a manner that simplifies the processing required to parse and interpret the embedded information. Headers for the HDTP contain pairs of ASCII text strings, each string terminated by a null or zero-valued byte. The first string in each pair specifies a key or parameter name and the second string provides the key's value. Most headers contain a single byte that specifies the header type. Frequently used keys and values can be encoded into single bytes having a value from 128 to 255.

In preferred embodiments, remote device 11 also checks during initialization for anything relevant that is pending in computer 31. For example, responses or message entities may have queued up in computer 31 while the session with remote device 111 was suspended.

Most practical implementations of remote device 11 do not maintain accurate time. In preferred embodiments, during initialization or at any time thereafter, remote device 11 can obtain the current time from computer 31 by a request.

Reducing Perceived Latency

Various network services including electronic mail have the ability to notify a user when some asynchronous or unsolicited event has occurred or is about to occur. In this context, the term "unsolicited" refers to an event that is not a direct result of some user request. A notification of the arrival of one or more pieces of electronic mail or data from other users or from services providing periodic stock price quotations are examples of unsolicited events. In response to the notification, a user can request delivery of the mail, the data, or some other message from the network server that provided the notification. Referring to the Figure, the network service providing the notification may reside on server 51, for example, or it may reside on computer 31.

The time required to obtain the unsolicited information is at least as great as the total time it takes to convey the request to the server and to convey the reply from the server to the user's terminal or workstation. In conventional systems, the communication time is usually not a factor; however, as mentioned above, signal propagation time between remote device 11 and computer 31 can be significant in systems where the communication path has a low bandwidth. For example, data communication via wireless telephones is sometimes restricted to as little as a few hundred bits per sec.

Significantly, the primary source of user dissatisfaction in such applications is how much time is spent waiting for return of the reply, not when the reply actually arrives. For example, if electronic mail were to arrive in a user mail box at 3:00 p.m. most users would not be concerned whether the mail reached their terminal at 3.02 p.m. or 3:05 p.m. What is of concern, however, is the perceived delay, the time spent waiting for requested information to arrive. The perceived delay can be greatly reduced by delivering at least a portion of the unsolicited information to remote device 11 before notifying the user.

In one embodiment, a network service receives messages representing one or more instances of unsolicited information for remote device 11. That network service causes computer 31 to generate one or more message entities representing at least a portion of the unsolicited information and to send those message entities to remote device 11. Preferably, the message entities are assembled into one or more HDML decks that are contained in a digest. Also included in the digest is a message entity that specifies an operation, or type of operation, that remote device 111 is to perform to notify the user. The notification may be a visual presentation on screen 12, or it may be an aural or tactile presentation by some other suitable transducer. The notification may also be accompanied by text, presented on display 12, explaining the nature of the notification. The message entity specifying the notification can also contain the URL of any related hypermedia entity such as the fulltext of electronic mail, embedded files, an "entry" card for preparing an immediate reply, etc.

In electronic mail applications, the digest preferably includes cards representing a portion of each piece of mail, say the first 100 characters, one or more cards containing a list of all mail in the user's mail box, and a card with one or more URLs that causes the network service to deliver the text of one or more messages. Remote device 11 should process the cards, decks and other message entities included in the digest in strict order. Significantly, the notification or alert message entity should be processed after the preceding message entities have been stored in storage 14 and are available for display or other processing.

In practice, notification or alert message entities are often used with "prefetch notifications." Prefetch notifications specify a deck or digest which an application executing in remote device 11 requests and stores in storage 14 before notifying a user.

In preferred embodiments of remote device 11, notification or alert message entities are stored in persistent storage and a card is provided that displays a list of alert message entities that have been sent to remote device 11. An indication of whether a user has acted on a notification is stored and displayed for each respective alert message entity. When a new alert message entity arrives, remote device 11 determines if a duplicate entity is already stored. If a duplicate entity is stored, the older entity is deleted and the new entity is stored, clearing any indication that the user has acted on the corresponding notification.

Saving Lists of Bookmarks

In devices like wireless telephones, there is usually insufficient storage to save lists of frequently used hypermedia links, e.g., URLs. This limitation reduces the usefulness of these devices because hypermedia links are usually difficult to remember and especially difficult to enter into the device. Software products for conventional computers provide facilities to save lists of these links. Two popular products refer to these stored links as "bookmarks" and "favorites."

This limitation is overcome by storing designated hypermedia links or bookmarks on a network server, referred to herein as a bookmark server. In one embodiment, the URL of this server is sent to remote device 11 during initialization of the device.

In response to the activation of a particular button 13, remote device 11 uses the bookmark server URL to construct a request to save the bookmark of the deck containing the currently displayed card. This may be done by appending the bookmark server URL with an argument specifying the deck bookmark and submitting the request to computer 31. Computer 31 passes the request to the bookmark server. The bookmark server services the request by saving the bookmark specified in the argument in a list uniquely associated with remote device 11. In addition, an entry card can be used to prompt the user for a name or description of the bookmark. The name and bookmark URL are sent to the bookmark server which saves the bookmark and accompanying name in the list. Preferably) the bookmark server can also store one or more state variables used by remote device 11 to display or process the associated deck. For example, a state variable may be used to save information that a user entered through an entry card. These state variables can be conveyed to the bookmark server by additional arguments appended to the server URL.

In preferred embodiments, decks and specified cards within decks may contain indications that they cannot be bookmarked. If a user attempts to save a bookmark for such a card or for any card with such a deck, remote device 11 is caused to display an appropriate message informing the user that the current card cannot be marked.

Remote device 11 can request all or part of the stored list by sending an appropriate request to the bookmark server. In one embodiment, the request comprises the URL of the bookmark server appended with an argument specifying the first entry in the list to send. For example, an initial request would specify the first entry in the list. In reply, the bookmark server would build a response representing entries one through N and a value referencing entry number N+1. A subsequent retrieval request from remote device 11 would include the URL of the bookmark server appended with an argument specifying the N+1 entry. By continuing in this manner, the user is able to retrieve and display all entries in the stored list of bookmarks.

The deck and cards in the reply received from the bookmark server can also contain methods for modifying or deleting bookmarks in the stored list. A request to modify a bookmark can be made by appending the bookmark server URL with arguments specifying a change to the selected bookmark and the desired change. Similarly, a request to delete a bookmark can be made by appending the bookmark server URL with arguments specifying a deletion of the selected bookmark.

By implementing the bookmark server as a standard HTTP server, the bookmark list for a user cat be accessed and maintained by any standard HTTP client. This feature allows a user to setup and maintain the list more easily using a conventional computer.

Annex and Incorporated Documents

Documents in an Annex to this main disclosure, computer listings in the microfiche appendix, and documents incorporated herein by reference, include specifications, proposals, specific implementations and features of particular products that describe and embody various aspects of the present invention. Terms such as "required," "must," "significant," "necessary," "minimum" and "maximum" refer to particular embodiments disclosed therein and do not represent limitations on the scope of the present invention. Because these documents describe several versions of specific products, specifications and proposals, some features and terminology may differ among the several documents and this main disclosure. Not all features described therein are required to practice the present invention; the various features may be used in essentially any combination. These documents describe some features that are either omitted or are not discussed in as much detail in this main disclosure. To this extent, these documents augment the main disclosure. To the extent that these documents disclose or suggest limitations that are not described in the main disclosure, those inconsistencies are to be resolved in favor of the main disclosure.

What is claimed is:

1. A method comprising:
   receiving at a wireless client device a network resource over a wireless link used for wireless telephony;
   receiving at the wireless client device a user input applied at a user interface of the wireless client device;
   generating a request at the wireless client device in response to the user input, the request including an identifier of the network resource; and
   sending the request to a remote server via the wireless link to cause a set of bookmarks stored in the remote server and associated with the wireless client device to be updated based on the request, each of the stored bookmarks representing a network resource, the set of stored bookmarks being accessible to the wireless client device via the wireless network to enable a user of the wireless client device to select any of the stored bookmarks to generate a request for a corresponding network resource, wherein the wireless client device does not have to store any data representing any of the bookmarks to request and receive the set of bookmarks.

2. A method as recited in claim 1, wherein the bookmarks are Uniform Resource Locators (URLs).

3. A method as recited in claim 1, wherein the identifier is appended to a network locator of the remote server in the request.

4. A method as recited in claim 1, wherein at least one of the stored bookmarks has been previously added to the set of stored bookmarks by a user of the wireless client device.

5. A method as recited in claim 1, wherein the request comprises an add request to cause the set of stored bookmarks to be updated by adding a bookmark to the set of stored bookmarks.

6. A method as recited in claim 1, wherein the request comprises a delete request to cause the set of stored bookmarks to be updated by deleting a bookmark from the set of stored bookmarks.

7. A method as recited in claim 1, further comprising including in the request a state variable used by the wireless client device.

8. A method as recited in claim 7, wherein the state variable represents user input received at the wireless client device.

9. A method comprising:
   sending a request, from a wireless client device over a wireless link used for wireless telephony, for a set of identifiers stored in a remote server, each of the identifiers representing a network resource and being associated with the wireless client device in the remote server, wherein the wireless client device does not have to store any data representing any of the identifiers to request and receive any of the identifiers; and
   receiving at the wireless client device at least one of the requested-identifiers via the wireless link in response to the request.

10. A method as recited in claim 9, wherein the set of identifiers comprises a plurality of Uniform Resource Locators (URLs).

11. A method as recited in claim 9, wherein the request for the set of identifiers comprises a network locator of the remote server and an argument for use in locating the set of identifiers appended to the network locator of the remote server.

12. A method as recited in claim 9, wherein at least one of the stored identifiers has been previously added to the set of stored identifiers in response to a request from the wireless client device.

13. A method as recited in claim 9, further comprising:
   receiving at the wireless client device a network resource over the wireless link, the network resource having an identifier;
   receiving at the wireless client device a second user input applied at a user interface of the wireless client device;
   generating a second request at the wireless client device in response to the second user input, the second request including the identifier; and
   sending the second request to the remote server via the wireless link to cause the set of stored identifiers to be updated based on the request.

14. A method as recited in claim 13, wherein the request comprises an add request to cause the set of stored identifiers to be updated by adding the identifier to the set of stored identifiers.

15. A method as recited in claim 13, wherein the request comprises a delete request to cause the set of stored identifiers to be updated by deleting the identifier from the set of stored identifiers.

16. A method comprising:
   storing in a server system a set of resource locators associated with a wireless client device, the set of resource locators being accessible to the wireless client device via a wireless link used for wireless telephony, to enable a user of the wireless client device to select any of the stored resource locators to generate a request for a corresponding network resource, wherein the wireless client device does not have to store any data representing any of the resource locators to request the set of resource locators;
   receiving, at the server system from the wireless client device via the wireless link, a request to update the set of stored resource locators, the request including a resource locator of a network resource accessed by the wireless client device; and
   updating the set of stored resource locators based on the request.

17. A method as recited in claim 16, wherein the resource locator comprises a Uniform Resource Locator (URL).

18. A method as recited in claim 16, wherein the resource locator is appended to a network resource locator of the server system in the request.

19. A method as recited in claim 16, wherein at least one of the stored resource locators has been previously added to the set of stored resource locators by a user of the wireless client device.

20. A method as recited in claim 16, wherein the request comprises an add request to cause the set of stored resource locators to be updated by adding the resource locator to the set of stored resource locators.

21. A method as recited in claim 16, wherein the request comprises a delete request to cause the set of stored resource locators to be updated by deleting the resource locator from the set of stored resource locators.

22. A method as recited in claim 16, wherein the request comprises a state variable used by the wireless client device.

23. A method as recited in claim 22, wherein the state variable represents user input received at the wireless client device.

24. A method comprising:
   storing in a server system a set of resource locators associated with a wireless client device, the set of resource locators being accessible to the wireless client device via a wireless used for wireless telephony, to enable a user of the wireless client device to select any of the stored resource locators to initiate a request for a corresponding network resource;

receiving at the server system a request for at least one of the resource locators from the wireless client device via the wireless link, wherein the wireless client device does not have to store any data representing any of the resource locators to request the set of resource locators; and sending a requested resource locator to the wireless client device via the wireless link in response to the request.

25. A method as recited in claim 24, wherein the set of resource locators comprises a plurality of Uniform Resource Locators (URLs).

26. A method as recited in claim 24, wherein at least one of the stored resource locators has been previously added to the set of stored resource locators by a user of the wireless client device.

27. A method as recited in claim 24, further comprising:

receiving at the server system a second request from the wireless client device via the wireless link, the second request including an identifier of a network resource accessed by the wireless client device; and updating the set of stored resource locators based on the second request.

28. A method as recited in claim 27, wherein the second request comprises an add request to cause the set of stored resource locators to be updated by adding the identifier to the set of stored resource locators.

29. A method as recited in claim 27, wherein the second request comprises a delete request to cause the set of stored resource locators to be updated by deleting the identifier from the set of stored resource locators.

30. A method as recited in claim 24, further comprising, prior to said receiving at the server system a request from the wireless client device:

receiving a request at the server system for a set of identifiers representing at least part of the set of stored resource locators from the wireless client device; and sending the set of identifiers to the wireless client device via the wireless link.

31. A method as recited in claim 30, wherein the request for the set of identifiers comprises a network locator of the server system and an argument for use in locating the set of identifiers appended to the network locator of the remote server.

* * * * *